Dec. 27, 1966     C. M. HARDING     3,293,862
OVERFLOW FISHWAY

Filed Aug. 21, 1963     2 Sheets-Sheet 1

INVENTOR
CHARLES M. HARDING

Dec. 27, 1966 C. M. HARDING 3,293,862
OVERFLOW FISHWAY
Filed Aug. 21, 1963 2 Sheets-Sheet 2

INVENTOR
CHARLES M. HARDING

United States Patent Office 3,293,862
Patented Dec. 27, 1966

3,293,862
OVERFLOW FISHWAY
Charles M. Harding, 15310 64th Ave. S.,
Tukwila, Wash. 98067
Filed Aug. 21, 1963, Ser. No. 303,490
7 Claims. (Cl. 61—21)

This invention relates to the design and operation of a fishway for enabling salmon or other fish to pass over a dam or other barrier in a river or stream. It is entitled an overflow fishway to describe it as a class of fish conveyance which is installed on the overflow or spillway section of a dam.

In order to provide for the passage of fish over obstructions in streams, numerous types of fishways have been developed and are in present use. In many cases the fishway has been arranged to provide a passage around the obstruction by using a diversionary tunnel or channel. Other types propose a fish ladder, fish lock or fish conduit erected to enable fish to pass more directly into the upper water of the reservoir, each of these types having been found useful for certain localities or on types of stream barriers where the vertical height is not excessive for their operation. However, the development of water resources for irrigation, water supply and electric power, has required construction of dams of increasing height, and the application of fishways to such structures has been found difficult due to technical limitations of presently known types of fishway structures when applied to dams which may, in typical cases, have a height of 100 to 300 feet above the stream bed; others sometimes exceeding 500 feet, or even 700 feet, in height. Such obstacles cannot be satisfactorily surmounted by those types of fishways which are in common use today on lower dams. These conditions require that existing fishways be improved or new types be produced to insure the natural perpetuation of fish life where water resources are being developed. The overflow fishway hereinafter described is proposed as one type of fishway which may be used on high dams, and has been designed with a view to application on rivers where facilities are required for the passage of migrating salmon. A description of its method of operation will be given by first referring to several general types of fishways, as follows:

Fishways can generally be defined to consist of a structure tunnel or channel, containing a medium of water by means of which fish may swim from lower to upper levels. They can be classified according to the method of supplying the body of water by means of which the fish may travel through the fishway, and have used either continuously moving, stationary, or intermittent supplies of water for this purpose.

In those types of fishways in which continuously flowing water is used as a conveyance for fish in a conduit, tunnel, or channel, the greatest problem to be overcome is the high velocity of the water leaving the lower entrance. As the height of dams on which these fishways are applied increases, the velocity increases approximately in proportion to the square root of the height and at a certain height the velocity becomes so high that fish are unable to enter or navigate the full length of the fishway. Various methods have been proposed to reduce the velocity.

In a pipe or tower, in which the upper and lower ends are completely submerged, and a continuous flow of water passes downward through the conduit, the escape velocity can be decreased by inserting a restriction or throat in the conduit. When the height of water is not great, a restrictive throat can be constructed which will limit the velocity to reasonable values, and at the same time be large enough to permit the passage of fish. However, when the water column is high, great force is exerted on the throat and it becomes, in effect, an orifice across which a large amount of energy is required to be dissipated in friction, and the velocity in the throat becomes too high for fish to navigate. Furthermore in the design of the throat, a certain limit is placed on the size of the orifice which can be used. If the diameter is made less than the critical diameter, the main column of water in the conduit below the throat sinks to the bottom of the conduit, and water passes through the throat in a thin jet directed downward into the water at the base of the tower. Hence in attempting to use a single restriction to limit the velocity, the continuity of the column of water may be destroyed, making the section below the throat an impassable void.

In a vertical tower or column in which water is continuously flowing, the restriction of velocity may be obtained by dividing the tower into numerous floors and vertical passages, where the energy of the water is largely dissipated in turbulence and surface friction, and the floors act as resting places for the fish. However in attempting to apply this type of fishway to high dams, the passages must be made small to hold back the flow of water. Sufficient space cannot be provided for the passage of large fish, and the escape velocity cannot be restrained sufficiently to enable fish to enter the base of the tower.

In a long open flume, diversionary channel, or tunnel constructed to by-pass a dam, a type of fishway may be employed in which a continuously moving stream is made to pass over a gradual slope, or over a series of falls or cascades. In this method the total head is distributed over a long route in which the velocity is restricted by channel friction to a desirable uniform value. Where high dams are involved, this may require a flume of considerable length, and to accommodate large fish the flume must be wide and deep, requiring heavy construction with supports at frequent intervals to maintain the weight of the flume and the water. Costs of such construction, particularly in mountainous country, are very high. For high dams requiring long flumes, the lower end of the fishway may be a mile or more downstream, and it is probable that the majority of fish will miss the entrance. This is especially true of salmon which in their course upstream, follow the path of their previous departure, having a predetermined destination which is the locality of their original spawning beds. Salmon will, therefore, follow the main body of the river, and will not follow actual or apparent tributaries of such a stream if they formerly came down the main branch, so that the best location for the entrance of a diversionary type fishway would be near the base of the dam where the salmon congregate. Such a location is impossible, however, if the dam is high and the flume or channel is necessarily of great length.

In view of the foregoing limitations of continuous flow fishways, the writer has investigated the use of a system using a vertical conduit passing directly over the face of a dam, in which the upper end is partly submerged in the water spilling from the reservoir, and the lower end is equipped with a gate and partly submerged in a swimming area at the base of the dam. Such a system would provide an intermittent column of water for conveyance of fish, being filled from above, and rising and falling under control of the gate in the bottom of the conduit. This system is imperfect since water falling freely would strike the bottom of the conduit with great impact, driving fish from the entrance of the conduit. However it is a common procedure in the construction of dams, in order to provide a path for water from the overflow section to arrive at the bottom of the dam with minimum impact, to construct the surface of the spillway in the form of an ogee curve, which is so calculated that water tends to cling to the surface and the energy of the water is largely expended in surface friction. I have therefore considered erecting the conduit on the surface of the spillway or integral with it, or if no such surface were contemplated, as in the case of arch dams where the overflow falls vertically onto an apron, to provide a spillway and conduit specifically for the use of the fishway. However, when the conduit is full, and the gate is opened to relieve water from the conduit, the water will be rejected with great velocity, driving fish from the vicinity of the entrance. To overcome this a dewatering valve can be installed near the base of the conduit, with a pipe or channel leading to a point remote from the fishway where the water can be discharged. To provide a suitable entrance for the fish, the conduit can be extended a considerable distance horizontally at the base of the dam, forming an enclosure for the accumulation of fish.

In considering these improvements to the elementary system first described, I have visualized a large concrete tunnel or aqueduct laid out on the sloping spillway curve of a dam. On the floor of the aqueduct a relatively thin sheet of water flows along the spillway curve, adhering to it and not filling the aqueduct which is otherwise emtpty and open to the atmosphere, so that when a gate at the lower end is closed, and water rises gradually in the aqueduct, the salmon will, in their instinct to overcome the barrier to their progress upstream, "nose into" the water coming down the spillway, being urged forward and upward as the water rises towards the crest of the dam.

I have observed that a large swimming area of considerable depth can be excavated in the river channel directly downstream from the entrance, and adjoining thereto, into which water is continually flowing from the fishway when the gate is open, and located in such a way that it is continually receiving water from adjacent spillways when the gate is closed, thus encouraging fish to enter and congregate in the entrance to the fishway.

In addition, the amount of water coming down the spillway can be regulated in the customary way by stop logs or crest gates at the top of the spillway, and the nappe, or sheet of water passing over the crest of the dam can be made several feet or more in depth, so that when the water rises and fills the aqueduct, the level will be equal to that of the water behind the dam, and there will be a continuous stretch of water, existing at a depth of several feet or more above the level of the submerged stop logs or crest gates, through which the fish may swim into the water of the forebay, and continue their passage upstream. To make a complete and operable fishway the gate and dewatering valve may be equipped with operating mechanisms so that they may be controlled by automatic means, according to any desired time cycle, and there may be added numerous other commonly known devices and appurtenances necessary to proper operation which will be later specified.

The fishway thus described uses a type of structure which can be applied to a dam of any height and uses the surface of the spillway to obtain a counterflow effect in which the fish rise with the water level into the flow of water coming down the spillway. This type of fishway has a number of useful properties:

It provides a passage for fish directly up the channel of the river and in so doing is adapted to the habits of salmon, which in migrating are not inclined to forage for food, but accumulate in large numbers at the base of the obstruction.

It takes a direct route to the forebay, over the spillway of the dam, requiring a minimum of material and labour in construction.

It is economical in the use of water, since it uses an intermittent supply, and does not drain continuously from the reservoir. During dry weather or during storage periods the time cycle can be varied by setting of automatic devices to operate at infrequent intervals or as determined by experience with the number of fish accumulating in the swimming area.

It employs a dewatering valve(s) which serves a dual purpose, since in addition to diverting high velocity discharge away from the swimming area, it also relieves pressure on the downstream gate, so that the gate is not required to open against the static head of water in the aqueduct. Consequently the gate can be made to ample proportions, equal to the full depth and width of the fishway, thus providing a natural access free from sectional restrictions at the entrance. The operating mechanism, guides and bearings, will not be required to operate under the heavy duty otherwise imposed.

It provides a clear unobstructed path from the base to the crest of the dam, since as in contrast to fishways utilizing a continuous flow of water, there are no similar restrictions, baffles or extended passages.

It is capable of exact design in all component parts, and utilizes commonly known materials and devices.

It is normally constructed of reinforced concrete, requiring little maintenance and is not subject to blockage by debris.

It is capable of handling the largest fish found in rivers and streams and the section of the conduit is amply proportioned to permit the passage of large schools of fish in each operation.

In drawings which illustrate embodiments of the invention,

Figure 1:
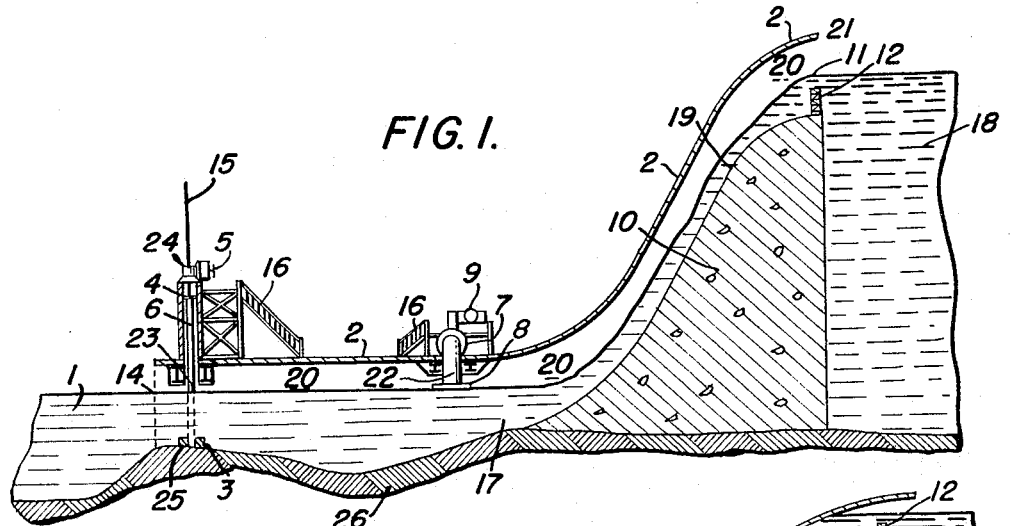
FIG. 1 is a side elevation partly in section.

The fishway is illustrated in FIG. 1 where it is shown constructed on the spillway curve 19 of a stream dam 10. Water impounded in the forebay 18 of the reservoir, passes over the stop logs 12 in a sheet or nappe 11 and enters the aqueduct 20, passing downward over the spillway curve. The descending flow of water is retained on the spillway surface which is an ogee curve or other calculated curve or gradual slope. The water therefore, does not fill the aqueduct, and the space between the spillway and the roof 2 is empty and open to the atmosphere. The air space is continuous from the upstream opening 21 to the downstream opening 14, and water passes through the fishway in a continuous flow when the downstream gate 6 is in the raised or open position. The gate can be of any suitable type and is represented here as a vertical lift type, being supported by a steel structure 4, and being raised and lowered by electric motor operators 5 mounted at the top of the structure. The motor operators are equipped with gear reducers 24 which operate on threaded stems 15 which are attached to the gate, and pass through the gear boxes. The motor operators provided with gear reducers and electric control devices are available as complete units from various manufacturers.

The gate, being large, is made of the lightest possible construction and may be made of steel plate with rolled steel beams or channel or trussed beams welded to the back. The gate lowers into a seat 3, and the upper slot 23 through which the gate passes, may be made water tight by a labyrinth seal faced with rubber and attached to a flange on the top edge of the gate, so that when the gate is lowered to the fully closed position, the seal on the gate flange interlocks with the mating seal on the top surface of the aqueduct. Flat rubber facing may be installed for sealing the other edges of the gate. (The foregoing gate details are not illustrated since the gate and mechanism may take various forms, being preferably manufactured by firms specializing in hydraulic machinery.)

A dewatering valve 7 is installed on the top surface of the aqueduct 2 and a suction pipe 22 extends a short distance downward into the fishway. The bottom edge or opening of the suction pipe is slightly below the surface level of the water in the swimming area outside of the fishway so that during that part of the cycle of operation in which the dewatering valve is discharging water, the water level on both sides of the downstream gate can be made equal. Thus when the downstream gate is opened there will be no discharge of high velocity water into the swimming area. The suction pipe is equipped with a screen 8 and a backing grid to prevent distortion of the screen, these being provided to prevent the possibility of fish entering the valve. The operation of the valve is controlled by a timing device as well as by float operated controls, so that the valve is opened by the timing device according to a prearranged interval and closed by float control when the water levels on either side of the gate have been equalized. The valve can be any suitable type of sluice valve, equipped with an operating mechanism 9, as available from numerous manufacturers, and may be hydraulic, electric, pneumatic or any other approved type. The valve 7 illustrated in FIG. 1 represents a 60 inch butterfly valve with an electric motor operator. Two or more valves may be required for a large fishway since the capacity must exceed the volume of water coming down the spillway. For while levelling takes place, water continues to flow down the spillway, and to enable water levelling to take place in a reasonable time, the valve or valves should have a discharge capacity considerably in excess of the inflow. In some cases it may prove desirable to install an automatically controlled crest gate on the spillway, to cut off water while the column of water in the aqueduct is being lowered. The crest gate and automatic control may be obtained from standard sources or may be built from a reinforced plate and operated by two small motor operators since it operates on a head of several feet only. The choice between an automatic crest gate and large discharge valves would be determined by circumstances involved with each individual installation.

The aqueduct varies in cross section being deepened to form a reservoir at the base of the spillway, and it is extended a considerable distance downstream. The width of the fishway is equal to that of a spillway section of the dam or a portion thereof. The aqueduct is built preferably of reinforced concrete and those portions carrying the weight of gates and valves are supported by transverse beams built into the concrete. The lower portions, being subject to the full static head of water in the aqueduct, when full, are more heavily reinforced and thicker in section than the upper shell of the aqueduct. The complete aqueduct is to be specially designed by those competent in the design of reinforced concrete structures, each fishway requiring individual design according to the height and type of dam to which it is to be applied. The central portion 17 of the downstream tunnel of the fishway may be deepened as shown in FIG. 1 to form a more natural pool for accumulation of fish than might be obtained if the floor were made flat. This is important to the successful operation of the fishway since it is essential that fish enter and congregate in this vicinity until the gate is closed. The portion 25 can be less deep to enable using a gate which is not of extraordinary height and weight. It is considered desirable to have the floor in this area of natural rock so that the side walls would require to be anchored and grouted to the rock to prevent movement and leakage when the fishway is full of water. Alternatively the floor can be of rough concrete monolithic with the side walls, but nevertheless anchored to bed rock and to the toe of the dam to prevent movement of the whole structure when static forces are exerted on the roof, walls and downstream gate. Access stairs and platforms 16 are required for the gate and valve mechanisms. The swimming area 1 is large in size and excavated in bed rock 26 to a depth considerably below the level of the gate seat 3.

Figure 5:
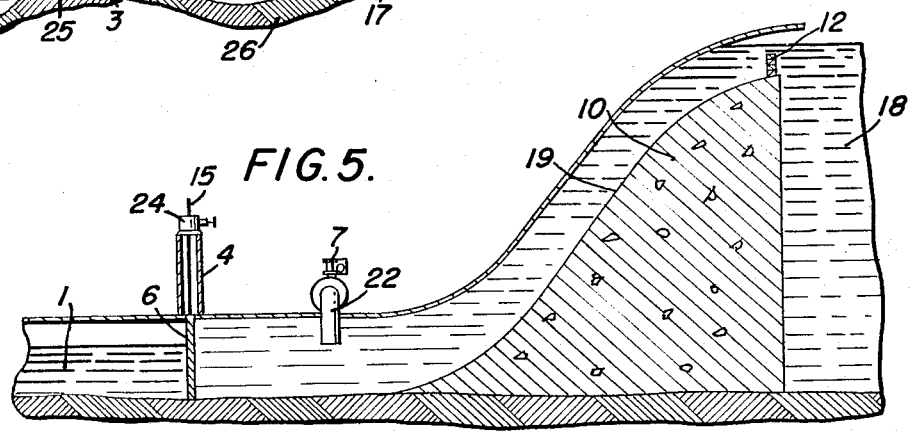
FIGS. 4, 5, 6 are diagrams which illustrate the cycle of operations.
Figure 4:
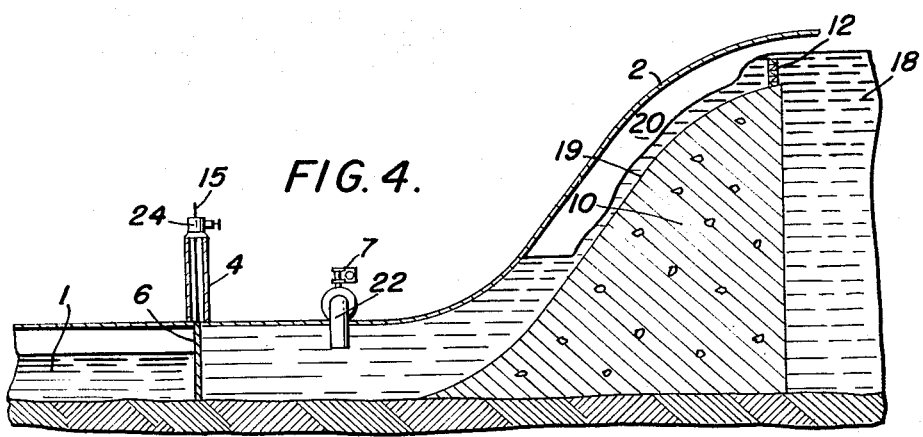
Figure 3:
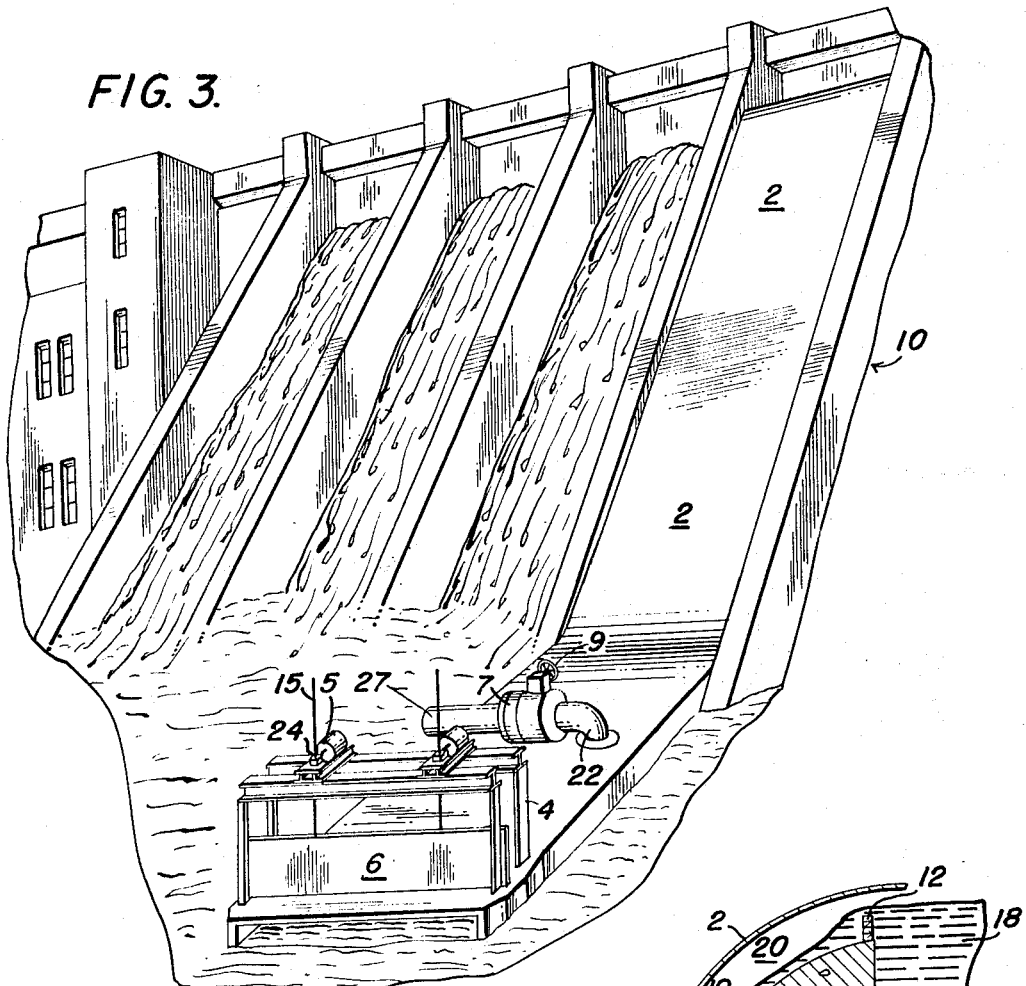
FIG. 3 is a general view showing the fishway installed on the end spillway of a dam.
Figure 6:
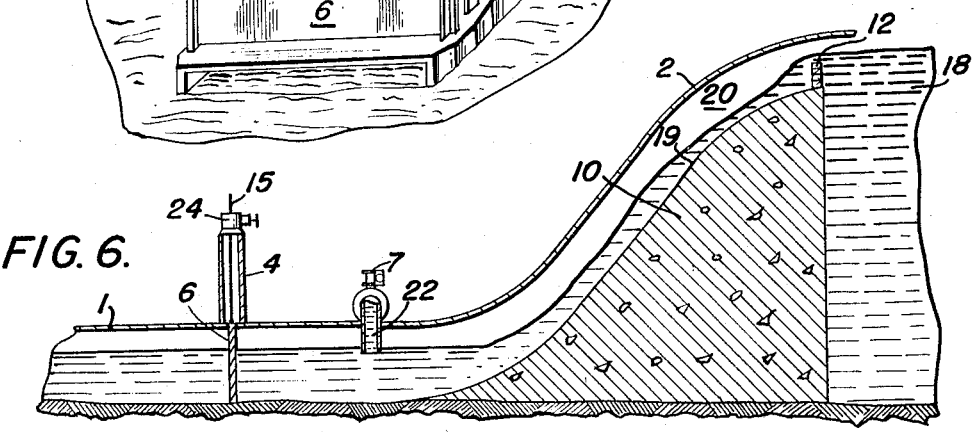

The cycle of operation is illustrated in FIGURES 1, 4, 5 and 6. In FIG. 1 the downstream gate is open and water passes continuously through the fishway into the swimming area. Fish coming upstream enter the swimming area and follow the flow of water into the fishway. After a predetermined period of time has elapsed, the gate mechanism gradually closes the downstream gate, water rises and fills the horizontal portion of the fishway and slowly rises in the sloping duct as shown in FIG. 4. Fish rise with the column of water, facing into the water coming down the surface of the spillway, until the water has risen to the level of the water in the forebay as shown in FIG. 5. At this point the flow of water into the fishway ceases, and the fish swim over the stop logs into the forebay. After a predetermined time interval, the operating mechanism automatically opens the dewatering valve and water descends in the fishway until the level is equal to that of the water outside of the fishway, as shown in FIG. 6, at which point the downstream gate begins to open and the dewatering valve closes through the medium of suitable control devices. When the downstream gate is completely open water flows freely through the fishway for a considerable length of time before the cycle of operations is again initiated by the timing device which controls the closing of the downstream gate. The length of time for each phase of the cycle of operation is adjustable so that each may be set according to experience gained in the operation of any particular fishway.

Figure 2:
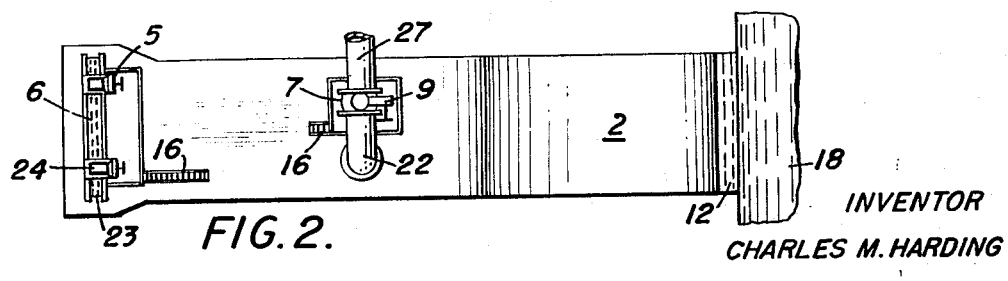
FIG. 2 is a top plan view.

In the construction of conduit 27, FIG. 2, the open end of the conduit may be left open to the atmosphere, in which case when the dewatering valve is opened, the water level will be brought down to the floor of conduit 27. For precise levelling as indicated in FIG. 6, the open end of conduit 27 can be submerged in the stream, so that the water will be brought down to the level shown, by siphon action, during the final stage of the levelling operation.

The overflow fishway uses an intermittent supply of water and is a form of fishlock having special features to enable its use on high dams.

Fishlocks are known to have an enclosure extending from the level of the water in the stream at the base of a dam to the upper surface level of the body of water impounded behind the dam. The enclosure is provided with an upper and a lower opening and gates are provided in these openings, the gates being usually operated by automatically controlled devices, according to a prescribed cycle of operations. A supply of water is provided by conduit at one or more fixed points in the enclosure.

In operation, the lower opening is closed, water rises to the upper level, the upper gate is opened, fish then leave the enclosure, the upper gate is closed, the lower gate is opened, and water discharges through the lower opening until water reaches the lower level.

In this operation the lower opening serves a dual purpose, since it acts as an entrance for the fish, and is also used to discharge water from the enclosure.

On high dams however, the dual service cannot be performed and at the same time provide an opening through which fish will voluntarily enter the enclosure. The type of entrance required is a clear rectangular opening, having a width which is large relative to the height. The types of valves developed for high head operation, such as butterfly and needle valves, having circular openings, and having portions of the closure mechanism dividing or partially blocking the opening are not suitable, since only the smallest of fish will normally enter these devices. A second difficulty which occurs in dual use of the lower opening, is the discharge of water into the swimming area outside the entrance. When the valve is opened to empty the enclosure, the water emerges as a high velocity jet (e.g. in an 800 foot fishlock, 227 ft./sec. or about 154 miles per hour), which clears fish out of the area in front of the entrance. The fish remain away from the area for a considerable length of time which defeats the purpose of the fishlock, since it is desirable to have fish outside the enclosure when the gate is opened.

A first improvement in fishways for high dams is to provide a means of discharging water from the enclosure before the gate is opened. Such a means has been described. Use of this device permits the installation of a suitable gate at the entrance which could not otherwise be done if the gate were required to open under the pressure of the high column of water in the enclosure.

As regards the minimum size of opening which may be used for the downstream opening, the writer offers a rule which may be used as a rough guide. It may be said that the minimum width of opening into which fish will voluntarily swim when entering an enclosure, bears a relation to the size, and in particular, to the body length of the fish. From casual experiments with captive fish it appears that the width of the opening should be at least twice (preferably three times) the length of the largest fish which would normally be found in the stream in which the fishway would be used. Thus if fish three feet in length are to be commonly found in a given locality an opening at least six (preferably nine) feet in width should be provided. The height of the opening can be less than half the width.

In the case of a very high dam, in which it may be difficult to build a dewatering valve to operate under a given head to empty the enclosure, it is necessary to install a second dewatering valve further up the enclosure, to relieve part of the water before the lower dewatering valve is opened. In a 700 foot fishlock for example, a second valve could be installed at the 350 foot level.

In the construction of the downstream gate it should not be assumed that the type of gate mechanism illustrated in the drawings is applicable to all dams. An alternative form of construction employs a gate which is made to swing inward by air cylinders or other devices thrusting against the outside of the gate, which eliminates the need for seals and stuffing boxes in the roof or wall of the enclosure.

The addition of means for dewatering the enclosure enables the construction of a proper size and type of entrance on fishlocks for the highest of dams, and prevents the eviction of fish from the entrance to the enclosure of such fishlocks when the downstream gate is opened.

A second improvement in fishlocks for high dams, is the addition of a spillway in the encosure. The spillway performs various function in the fishlock: it attracts fish into the enclosure, it guides them up the full height of the enclosure, it supplies water to the enclosure, and it provides a wide exit, without closure, over the crest into the forebay. (Crest gates may be used to regulate the flow but are of the type which do not block the opening.)

In the overflow fishway all conduit and other means of introducing water into the enclosure are removed, improved means of providing water being supplied by the spillway. The spillway, moreover, delivers water into the enclosure from above, at a variable level, as water rises in the enclosure.

It will be shown that the usual method of delivering water at a fixed location, particularly if at the base of the enclosure, is detrimental to the operation of the fishlock.

It is known that in fish hatcheries, the fish tend to congregate in great numbers around the pipe or sluice by which water is introduced into the pond or trough in which they are confined. This tendency appears to be instinctive in fish at all stages of growth. In their natural environment in streams it is well known that fish tend to congregate at the base of a rapid or fall. In a fishlock, if water is introduced at a fixed point at the bottom of the enclosure, the fish congregate around the flow of water emerging from the conduits and remain in this general vicinity as water rises in the fishlock. This situation is undesirable since it is necessary that the fish rise with the water level to reach the upper opening. The effect of fish staying down near the bottom of the tank or enclosure near the water inlet is not of particular consequence in a fishlock of small height. In such a fishlock the upper opening is relatively near the inlet and the fish find their way out of the enclosure when the gate in the upper opening has been opened after the enclosure is filled. In a fishlock of great height however the upper opening is remote from the source of water entering at the base of the enclosure, and fish tending to stay near the base of the enclosure, are still in the enclosure when the water level is lowered to start the next cycle of operations. The effectiveness and efficiency of the fishlock can be considerably improved if the fishlock is cleared of fish in each cycle. A means of doing this is provided by the spillway which, by delivering water into the enclosure from above, first creates an artificial fall which attracts fish into the enclosure. After the gate has closed, the fish accumulate at the base of the fall according to their natural habit, and the height of the fall is made to decrease by filling the enclosure until the fish are finally able to jump the remaining distance, or by following the inflow of water until it has ceased, to swim directly out of the enclosure over the crest of the spillway.

The improvements related in the foregoing in regard to the use of the spillway are: the addition of a means for inducing fish to swim up the full height of a high fishlock, an improved means of attracting fish into the fishlock, this consisting of a base of an artificial fall created inside the opening and replacing flow of water from conduits usually located inside the opening for attracting fish into the enclosure; an improved means of getting fish out of the fishlock when they approach or have reached the upper level, comprising an improved upper opening of large dimensions consisting of the full width of the spillway crest over which large numbers of fish may swim or jump at one time; an improved means of supplying water which prevents fish from remaining in the lower part of the enclosure.

In regard to the construction and use of the fishlock, it is desirable to indicate certain points of design of the spillway which are special to its application in the fishlock.

The overflow fishway uses a spillway which is essentially a low capacity or low discharge type. It is designed with an ogee crest calculated for a relatively small head of water passing over the dam, and may be operated with not much more water than is required to wet the surface of the downstream face. On higher dams it is most important to confine the flow to a thin sheet to make the most use of surface friction and turbulence reducing the velocity of water leaving the base of the spillway. Since the flow is not great, the bucket used at the toe of high discharge spillways is not used, and the toe is flared towards the opening of the fishlock. Reliance is placed on the hydraulic jump and the lower horizontal portion of the enclosure to act as a stilling basin to dissipate energy of water leaving the base of the spillway. (Ref.: Hydraulic Energy Dissipators—E. A. Elevatorski—McGraw-Hill — 1959 — Hydraulic-Jump-Type Stilling Basin.) The use of dissipators on the face of the spillway might prove effective, on a small spillway of this type. On higher dams the ogee curve may be extended down the face to retract the base, thereby reducing the size of the fishlock, i.e. compared with what it would be if the portion below the crest were constructed with a constant slope.

The enclosure of the overflow fishway consists of an enclosed spillway comprising the upper portion of the enclosure and an enclosed stilling basin in the lower portion, and has the shape of an aqueduct sloping down the face of the dam and extending out from the dam at its base. This shape of enclosure is particularly adapted to high dams, since it provides a path for fish from the lower level to the upper level with a minimum of material. This is an improvement over the usual form of fishlock using a tank with vertical walls, which requires a larger and more costly structure, and requires more water and a long time cycle of operations.

A strict definition of the term "high dam" is not obtainable. Some writers refer to "high head developments" as those exceeding 500 feet and may refer to low head developments as those below 50 feet. (Ref.: Power Plant Engineering—Frederick T. Morse—D. Van Nostrand Co. Inc.—1932—p. 159.) As used herein the term "high dam" refers to dams in excess of 100 feet in height.

In terminology relating to spillways, the following terms are used somewhat synonymously by various writers: overflow spillway, ogee spillway, overfall spillway, spillway of the ogee type, overflow spillway with an ogee crest. The ogee curve is known in hydraulics to be a parabolic curve, having the shape taken by water flowing over a sharp crested weir, and is calculated for the maximum head on the spillway and for the maximum velocity of approach to the spillway. The ogee curve may be constructed for the crest only, or may be extended part way down the face or may go all the way to the base of the dam. The term ogee spillway as used herein refers to a spillway, any portion of which, from the crest down, is designed with a profile corresponding to the maximum flow over a sharp crested weir placed at the upstream face of the dam. (Ref.: Handbook of Applied Hydraulics—Calvin Victor Davis—McGraw-Hill Book Co. Inc.—1942—p. 336—Spillways and Stream—Bed Protection Works—Emory W. Lane.)

The design of spillways for use in the overflow fishway is different from each dam. The selection of the type of spillway, and the selection of its profile, will be made by those skilled in the design of hydraulic structures, to suit the specific conditions applying to any given installation.

The length of the hydraulic stilling basin should be sufficient to provide adequate dissipation of energy of water leaving the spillway and to provide in addition an adequate space for the accumulation of fish between the spillway and the entrance. The portion 25, FIG. 1, comprises the dam of the basin, can be raised to give more depth if required. As previously indicated, it is necessary to have an air space under the roof, which is continuous from the upstream to the downstream opening. The creation of hydraulic jump at the rear of the basin will require the roof to be raised sufficiently to provide the necessary air space at this point.

In adapting the fishlock for use on high dams, the following conditions exist: the upper opening has been retained, closure in the upper opening has been removed, the usual means of supplying water at one or more fixed locations in the base of the enclosure have been removed, an enclosure spillway has been added to the upper portion of the enclosure, the downstream opening has been retained, the gate in the downstream opening has been retained, a discharge conduit and dewatering valve have been added, an enclosed stilling basin has been added to the lower part of the enclosure.

Disregarding the elements which have been removed, the foregoing changes are equivalent to adding to the elementary fishlock having a single enclosure, an upper and a lower opening, and a gate in the lower opening— the following items: A spillway forming an undermost inner surface of the upper part of the enclosure, a sloping roof above the upper part of the enclosure, said sloping roof and spillway comprising in combination with the side walls of the enclosure, an enclosed spillway in the upper part of the fishlock; a lower portion of the enclosure having a closed top, and extending from a junction with the upper part of the enclosure to the lower entrance, a depression being formed in the base, and a portion of the base near the entrance being raised above the depression to form a dam, said depression, dam, and closed top forming in combination with the side walls of the horizontally extended lower portion of enclosure, an enclosed stilling basin in the lower part of the fishlock; a discharge conduit of large proportions having an inlet opening inside the lower part of the enclosure and outlet end exterior thereto, and a power operated valve in the conduit, said valve being operable by automatic means to open and close according to a predetermined cycle of operations.

The embodiments of the invention in which an exclusive property or privilege is claimed are defined as follows:

1. In improvements to fishlocks for high dams, a covered enclosure extending along the face of the dam from the crest to the base thereof and downstream from said base, a bottom inner surface of said enclosure comprising a spillway therefor, an upper stream opening of said enclosure in fluid communication with the waters impounded by the dam, a gated downstream opening of said covered enclosure in fluid communication with the waters in the stream below the dam and downstream from the base, a conduit entering said covered enclosure extending downstream from said base, a valve in said conduit, an outlet end of said conduit directed to deliver water into the stream below the dam and to one side of the downstream extension of the enclosure.

2. In a fishlock, the improvements comprising a covered enclosure extending along the sloping face of a dam from the crest to the base of the dam, an underlying inner surface of said enclosure comprising a spillway internal to the enclosure, a lower extension of said enclosure projecting horizontally downstream from said base, an upper upstream opening of said enclosure in fluid communication with the waters impounded by the dam, a lower opening at the downstream extremity of said lower extension of enclosure and said opening having a gate therefor, said lower opening having fluid communication with the waters below the dam and downstream from said base, a conduit entering said lower extension, a valve in said conduit and an outlet end of said conduit disposed to deliver water into the stream at one side of said lower extension of the enclosure.

3. In improvements to fishlocks for high dams, a covered enclosure extending from the water surface in the forebay of a dam to the waters in the stream below the dam and downstream thereof, an upper upstream opening of the enclosure partially submerged in the waters of the forebay, said enclosure having a lower downstream opening with a gate therefor and said lower opening being partially submerged in the waters downstream from the base of the dam, an inner surface of said enclosure extending along the downstream face of the dam, said surface comprising a spillway internal to the enclosure and having an upper end communicating by way of the upper opening with the waters in said forebay, and having a lower end communicating by way of the lower part of the enclosure and said lower opening with the waters in the streams below the dam and downstream from the base threeof, a sloping portion of roof in the enclosure, said sloping portion extending downwardly from the upper opening and substantially parallel to the spillway, a horizontal portion of roof extending from a junction with said sloping portion to the lower opening, a conduit passing through the horizontal roof and having an open inlet end in the lower part of the enclosure, a portion of said conduit being exterior to the fishlock and having an open end disposed to discharge water into the stream, a valve in the exterior portion of conduit.

4. In improvements to fishlocks for high dams, a covered enclosure having an upper end opening in the forebay of a dam, a gated lower end opening of said covered enclosure in the stream below and downstream from the dam, the surface of an overflow spillway extending as a bottom for the fishlock enclosure and being along the sloping downstream face of the dam from the upper end opening to the lower part of the enclosure, a sloping portion of roof in the upper part of the enclosure, said sloping portion of roof being spaced above the spillway and substantially parallel thereto, and extending from the upper end opening to a junction with a horizontal portion of roof in the lower portion of the enclosure, the horizontal portion extending downstream from said junction to the lower end opening, a conduit passing through the horizontal roof and having an open inlet end below minimum water level in the enclosure, said minimum level being substantially equal to the water level of the stream exterior and adjacent to the lower part of the enclosure, an open outlet end of the conduit exterior to the enclosure, said outlet end being disposed to deliver water from the interior of the enclosure into the stream near the base of the dam, a portion of said conduit exterior to the enclosure, a motor operated valve in said exterior conduit.

5. In improvements to fishlocks for high dams, an elongated covered enclosure extending along the face of a dam and downstream from the base thereof, said enclosure having an upper upstream opening in the forebay of the dam and a gated downstream opening in the stream below and downstream from the base of the dam, the spillway surface of the overflow section of the dam comprising an inner surface of the fishlock enclosure and extending from the upstream opening to the lower part of the enclosure, the surface profile of the spillway being an ogee curve constructed for a relatively thin sheet of water passing over the crest of the dam, a sloping portion of roof spaced above and substantially parallel to the spillway, a horizontal portion of roof over the lower part of the fishlock enclosure, said horizontal portion extending from a junction with the sloping portion to the downstream opening, a conduit passing through the horizontal roof and having an open inlet end below minimum water level in the enclosure, an open discharge end of said conduit being disposed to deliver water from the interior of the fishlock enclosure into the stream at the base of the dam, a portion of said conduit exterior to the enclosure and at an elevation above the inlet opening, an electrically operated valve in said exterior portion of conduit.

6. In improvements to fishlocks, a covered enclosure extending along the face of a dam and having an upper upstream opening in fluid communication with the dam impounded water and a lower opening in fluid communication with the stream at the base of the dam and downstream thereof and said lower opening having a gate therefor, an overflow spillway defined by the face of the dam and for conveying water from the upstream opening obliquely downward into the variable surface level of water in the enclosure, said spillway having an upper termination communicating with the upstream opening and a lower termination in the lower part of the enclosure, said upper termination being submerged in a flow of water entering the upstream opening from behind the dam, a sloping roof in the enclosure spaced above and substantially parallel to the spillway, the spacing of the sloping roof above the spillway being such as to provide an air passage between the underside of the roof and surface of the water flowing down the spillway when water is at its lowest level in the fishlock, a horizontal portion of roof over the lower part of the enclosure, said horizontal roof extending from a junction with the sloping portion to the downstream opening, the underside of the horizontal roof being at an elevation above the surface level of the body of water in the lower part of the enclosure when said body of water is at its lowest level in the fishlock, means for lowering the water level in the enclosure while the downstream gate is closed, said means comprising a conduit passing through the horizontal roof and having an open inlet in the lower part of the enclosure and below minimum water level therein, said minimum water level being substantially equal to the level of water in the stream exterior and adjacent to the lower part of the enclosure, a portion of said conduit exterior to the enclosure and at an elevation above the inlet opening, an opn outlet end of said exterior conduit disposed to deliver water from the interior of the fishlock enclosure into the stream at the base of the dam, an electric motor operated valve in the exterior portion of conduit.

7. Improvements to fishlocks of the character described in claim 6 and having the open outlet end of said exterior conduit submerged in the waters of the stream at the base of the dam.

References Cited by the Examiner

UNITED STATES PATENTS

| | | | |
|---|---|---|---|
| 1,522,772 | 1/1925 | Fearnow et al. | 61—21 |
| 1,591,450 | 7/1926 | Wheeler | 61—21 |
| 2,381,100 | 8/1945 | Barr | 61—21 |
| 2,625,798 | 1/1953 | Reed | 61—21 |
| 2,683,969 | 7/1954 | Mugnier | 61—21 |

FOREIGN PATENTS 1,745     1890    Great Britain.

EARL J. WITMER, *Primary Examiner.*